(12) United States Patent
Sachs et al.

(10) Patent No.: US 8,050,232 B2
(45) Date of Patent: Nov. 1, 2011

(54) HANDOVER OPTIMISATION IN A WLAN RADIO ACCESS NETWORK

(75) Inventors: Joachim Sachs, Aachen (DE); Ian Herwono, Ipswich (GB)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 883 days.

(21) Appl. No.: 11/996,673

(22) PCT Filed: Jul. 25, 2005

(86) PCT No.: PCT/SE2005/001190
§ 371 (c)(1),
(2), (4) Date: Jan. 24, 2008

(87) PCT Pub. No.: WO2007/013839
PCT Pub. Date: Feb. 1, 2007

(65) Prior Publication Data
US 2008/0192696 A1 Aug. 14, 2008

(51) Int. Cl.
*H04W 4/00* (2009.01)
*H04W 36/00* (2009.01)
*G06F 13/00* (2006.01)

(52) U.S. Cl. .................. 370/331; 711/100; 455/436

(58) Field of Classification Search .................. 370/331
See application file for complete search history.

(56) References Cited

U.S. PATENT DOCUMENTS

| | | | |
|---|---|---|---|
| 7,480,274 B2 * | 1/2009 | Shitama et al. | 370/331 |
| 7,693,107 B2 * | 4/2010 | De Froment | 370/331 |
| 2002/0167965 A1 * | 11/2002 | Beasley et al. | 370/465 |
| 2003/0185172 A1 * | 10/2003 | Rue | 370/331 |
| 2004/0064581 A1 * | 4/2004 | Shitama et al. | 709/238 |
| 2004/0081119 A1 * | 4/2004 | Zhong et al. | 370/328 |

FOREIGN PATENT DOCUMENTS

| | | |
|---|---|---|
| JP | 2002-238067 A | 8/2002 |
| JP | 2003-047037 A | 2/2003 |
| JP | 2003-153327 A | 5/2003 |
| JP | 2003-264579 A | 9/2003 |

OTHER PUBLICATIONS

Cohen, R. et al. Handover in a Micro-Cell Packet Switch Mobile Network INFOCOM '95. Fourteenth Annual Joint Conference of the IEEE Computer and Communications Societies. Bringing Information to People. Proceedings IEEE Apr. 2, 1995.

* cited by examiner

*Primary Examiner* — Jeffrey Pwu
*Assistant Examiner* — Guang Li

(57) ABSTRACT

The invention provides a method for assisting handover of a communication session associated with a UT from a first radio access point, AP1, to a second radio access point, AP2, in a radio access network, said method to be carried out by said AP1 and comprising the steps of:—receiving a handover intention notify message comprising a session identifier identifying said session and indicating that said UT intends to perform a session handover,—assigning said session a buffer memory space in a memory of said AP1,—buffering downlink data packets addressed to said UT in said buffer memory as a response on receiving said handover intention notify message. The invention further provides a UT, an AP1, AP2, an AR, and software program/s co-operating and/or realizing the method according to the invention. The invention provides a smoother handover.

11 Claims, 11 Drawing Sheets

HANDOVER OPTIMISATION IN A WLAN RADIO ACCESS NETWORK

TECHNICAL FIELD

The invention relates generally to radio access networks and more specifically to methods and means for assisting handover of a communication session in such networks.

BACKGROUND

FIG. 1 illustrates the basic network architecture of a conventional radio access network 100, in form of a wireless local area network, WLAN, comprising a first access point AP1 110, a second access point AP2 120, and an Access Router, AR 150. The WLAN 100 may be connected to other network/s 160 such as e.g. the Internet and/or a UTRAN (Universal Terrestrial Radio Access Network). In FIG. 1, AP1 110 and AP2 120 are connected with AR 150 via Multicast-enabled Layer 2 Switches, M-L2S1 130 and M-L2S2 135, respectively, but many other possibilities exist. The APs may e.g. be connected directly to AR 150 without any intermediate M-L2Ss, or they may be connected to the same M-L2S which in turn is connected to AR 150. Since the Ethernet (IEEE 802.3) protocol is used for most of the WLAN access points today as layer 2 protocol to communicate with fixed network infrastructure, an M-L2S is identical with an Ethernet switch. A User Terminal, UT, 140 having a communication session, e.g. a data session or a Voice over IP session with a peer connected to the network 160 (e.g. Internet or UTRAN), routed via AP1, 110, normally performs a handover of the session from AP1, 110, to AP2, 120, whenever a certain handover criterion is fulfilled. The criterion is normally a function of the offered radio link quality and/or QoS (quality of service) of AP1 110 and AP2 120, respectively, so that the UT's 140 communication session will be routed through the access point offering the highest/best radio link quality/QoS, in a conventional manner. However, the handover criterion may be based on other aspects e.g. regarding accounting, security etc.

General problems regarding effective handover schemes for radio access networks relate e.g. to data loss minimization, interference suppression, packet delay minimization and to minimize network signaling.

More specifically, for the WLAN in FIG. 1 exploiting the IEEE 802 standard, the establishment of a security association between the UT 140 and a target AP, i.e. AP2 120 in case of a handover from AP1 110 to AP2 120 in FIG. 1, when applying a standard EAP (Extensible Authentication Protocol) authentication in accordance with the IEEE 802.11i security specification may pose a crucial issue regarding the caused interruption time, i.e. it may cause unacceptable packet delay/loss for real time applications such as voice and/or video. Such an authentication is carried out after that the UT 140 has been successfully associated with the new AP (AP2 120 according to above example), and the radio link connectivity between UT 140 and the old AP (AP1, 110) is thus already aborted. During the period between the initiation of association with a new target AP (AP2, 120) and completion of the EAP authentication and installation of the security parameters at the new target AP, no data (e.g. IP-) packets can be exchanged between UT 140 and AR 150 over the WLAN transmission path, which of-course constitutes a problem.

Another problem associated with the handover of TCP-sessions in radio access networks is that received packets being out of order will be retransmitted, which increases the radio interference, and the transmission rate may also be tuned down as a consequence, since the TCP interprets packets being out of order as a network congestion state.

SUMMARY OF THE INVENTION

The present invention seeks to mitigate/solve above problems.

It is an object of the present invention to improve the handover characteristics of radio access networks, such as e.g. a WLAN or a UTRAN (Universal Terrestrial Radio Access Network).

It is an object of the present invention to minimize data loss and/or to decrease the interference and/or the packet delay/loss and/or the network signaling, during a handover of a communication session from one radio access point to another, in a radio access network.

It is a further object to mitigate the packet delay problems during handover, especially for real time applications such as voice and/or video, when applying an authentication procedure, such as an EAP standard procedure, in a wireless data network according to the IEEE 802 standard.

According to a first aspect, the invention provides a method for assisting handover of a user terminal's, UT's, communication session from a first radio access point, AP1, to a second radio access point, AP2, in a radio access network, said method to be used by said AP1, said method comprising the following steps:

receiving a handover intention notify message comprising a session identifier and indicating that said UT intends to perform a session handover, assigning said session a buffer memory space (213) in a memory (211) of said AP1 (210), buffering downlink data packets addressed to said UT (240) in said buffer memory (213) as a response on receiving said handover intention notify message.

In one embodiment, said radio access network is a wireless data network according to an IEEE 802 standard arranged to authenticate UTs requesting network access and wherein said session identifier is a MAC address of said UT (240) as defined by said IEEE 802 standard.

In one embodiment, the method further comprises the step of:

blocking the transmission of downlink session packets to said UT as a response on receiving said handover intention notify message.

In one embodiment, said handover intention notify message further comprises an AP-identifier identifying said AP2, indicating a handover of said session to said AP2, wherein the method further comprises the step of:

sending said buffered downlink packets to said AP2 as a response on receiving said handover intention notify message.

In one embodiment, the method further comprises the steps of:

receiving an association update message identifying said AP2 and indicating that said UT is associated with said AP2, sending said buffered downlink packets to said AP2 (220) as a response on receiving said association update message.

In one embodiment, the method further comprises the step of:

sending a handover intention notify message to an access router, AR, in said radio access network, said message indicating a handover of said session and comprising a session identifier of said communications session and instructing said AR to buffer downlink data packets addressed to said UT.

In one embodiment, said handover notify message which is sent to said AR further comprises an AP-identifier identifying said AP2.

According to a second aspect, the invention provides a method for assisting a handover of a user terminal's, UT's communication session from a first access point, AP1, to a second access point, AP2, in a radio access network, said method to be used by said AP2 wherein said method comprises the following steps:

establishing that said communication session is to be handed over from said AP1 to said AP2, sending a handover intention notify message to said AP1 indicating a handover of said session and comprising a session identifier identifying said session.

In one embodiment, the method further comprises the step of:

sending said handover notify message to an access router, AR, instructing said AR to buffer downlink data packets of said session addressed to said UT (240).

In one embodiment, said handover notify message further comprises an AP-identifier identifying said AP2.

In one embodiment, said radio access network is a wireless data network according to an IEEE 802 standard, said method further comprising the step of:

authenticating said UT by sending and receiving authentication credentials to/from UT, e.g. by means of the EAP standard.

According to a third aspect, the invention provides a method for assisting a handover of a user terminal's, UT's communication session from a first access point, AP1, to a second access point, AP2, in a radio access network comprising an access router, AR, for routing data packets to/from said UT via said AP1 and/or AP2, said method to be used by said AR and wherein said method comprises the following steps:

receiving a handover intention notify message indicating a handover of said communication session, buffering downlink data packets of said session in a buffer memory, as a response to said handover intention notify message.

In one embodiment, the method comprises the steps of:

receiving an AP-update-message comprising a session identifier identifying said session and an AP-identifier identifying said AP2, said message indicating a handover to said AP2, forwarding said buffered downlink data packets of said session to said AP2. In one embodiment, said radio access network is a wireless data network according to an IEEE 802 standard being arranged to authenticate UTs requesting access to said network.

According to a fourth aspect, the invention provides a method for assisting a handover of a user terminal's, UT's communication session from a first radio access point, AP1, to a second radio access point, AP2, in a radio access network, said method to be used by said UT and comprising the following steps:

a) establishing that said communication session is to be handed over from said AP1 to said AP2,
b) identifying a first data frame in a first buffer memory of said UT,
c) extracting a frame sequence number, FSN, from said first packet and storing said FSN in a first memory space of a second buffer memory of said UT,
d) forwarding said first packet to an application running on said UT or to a higher level protocol of said UT,
e) fetching a next packet from said first buffer memory being the next packet received by said UT after said first packet,
f) extracting a frame sequence number from said next packet, FSNNEXT,
g) establishing whether said next packet is a consecutive packet of said first packet by comparing said FSNNEXT with said FSN, and,
h) storing said FSNNEXT in said first memory space of said second buffer memory and forwarding said "next packet" to a higher layer protocol or to a final application if it was established in step g) that said "next packet" is a consecutive packet of said first packet, and otherwise buffering said "next packet" in a second memory space of said second buffer memory.

The step a) of establishing that said communication session is to be handed over from said AP1 to said AP2, may comprise any of the following steps:

a de-association of AP1, or,
an association of AP2, or,
a handover decision taken by UT according to a certain handover criterion, or,
a handover decision according to a certain handover criterion taken by a network node and signaled to said UT.

In one embodiment, the method further comprises the step of:

limiting the size of said second memory space of said second buffer memory by defining a maximum threshold number of stored packets/bytes for said second memory space or defining a maximum allowable storage time for a packet being stored in said second memory space.

In one embodiment, data packets received from AP1 and/or AP2 are stored in received chronological in said first buffer memory, being of a FIFO type, wherein said steps a) and e) of identifying a first and second data frame comprise the step of:

reading a data packet from said FIFO memory.

In one embodiment, the method further comprises the steps of:

reading a third data packet from said first buffer memory (FIFO) and establishing that said third data packet is a consecutive data packet of the data packet being the last packet forwarded to said application, forwarding said third data packet to said application or higher protocol layer and updating the first memory space of said buffer memory with the frame sequence number of said third data packet, establishing that there is at least one stored data packet in said second memory space of said second buffer memory, searching said first memory space of said second buffer memory for a consecutive data packet of said third data packet.

In one embodiment, said radio access network is a wireless data network according to the IEEE 802 standard and wherein said method further comprising the step of:

sending and receiving authentication credentials to/from AP2, for instance according to the EAP standard.

According to a fifth aspect, the invention provides a radio access point AP1 allowing a user terminal, UT, access to a radio access network by means of a radio link connection wherein said AP1 comprises means realizing the method according to the first aspect when said AP1 (210) is installed in a radio access network comprising a second access point AP2 and an access router AR.

In one embodiment, said means of the access point AP1 comprises a data memory having a first memory space with a first entrance forming a buffer memory for storing downlink packets addressed to said UT, said data memory further having a second memory space with stored program code means which, when loaded in a processing means of said AP1, make said processing means execute at least one procedure realizing said method.

In one embodiment, the AP1 is realised as an access point according to the IEEE 802 standard, arranged to realise said method when said AP1 is installed in a wireless data network according to the IEEE 802 standard, and wherein said AP1 is further arranged to authenticate user terminals requesting access to said wireless data network.

According to a sixth aspect, the invention provides a computer program product comprising program code means which, when loaded into a processing means of a first access point AP1, being installed in a radio access network, make said processing means execute at least one procedure realizing the method according to the first aspect of the invention.

In one embodiment, the computer program product includes a computer readable medium having said program code means stored thereon.

According to a seventh aspect, the invention provides a radio access point AP2 allowing a user terminal, UT, access to a radio access network by means of a radio link connection wherein said AP2 comprises means realizing the method according to the second aspect when said AP2 is installed in a radio access network comprising a first access point AP1 and an access router AR.

In one embodiment, said means of the access point AP2 comprises a data memory having a first memory space with a first entrance forming a buffer memory for storing downlink packets addressed to said UT, said data memory further having a second memory space with stored program code means which, when loaded in a processing means of said AP2, make said processing means execute at least one procedure realizing said method.

In one embodiment, the AP2 is realised as an access point according to the IEEE 802 standard, arranged to realise said method when said AP2 is installed in a wireless data network according to the IEEE 802 standard, and wherein said AP2 is further arranged to authenticate user terminals requesting access to said wireless data network.

According to an eighth aspect, the invention provides a computer program product comprising program code means which, when loaded into a processing means of a said access point AP2, being installed in a radio access network, make said processing means execute at least one procedure realizing the method according the second aspect of the invention.

In one embodiment, said computer program product includes a computer readable medium having said program code means stored thereon.

According to a ninth aspect, the invention provides an access router, AR, arranged to route a user terminal's, UT's communication session via a first access point, AP1 (210), and/or via a second access point, AP2, (220), wherein said AR comprises means realizing the method according to the third aspect of the invention when said AR is installed in a radio access network comprising said AP1 and AP2.

In one embodiment, said means of the AR comprises a data memory having a first memory space with a first entrance forming a buffer memory for storing downlink packets addressed to said UT, said data memory further having a second memory space with stored program code means which, when loaded in a processing means of said AR, make said processing means execute at least one procedure realizing said method.

In one embodiment, the AR is realised according to the IEEE 802 standard, being arranged to realise said method when said AR is installed in a wireless data network according to the IEEE 802 standard, and wherein said AR is further arranged to authenticate user terminals requesting access to said wireless data network.

According to a tenth aspect, the invention provides a computer program product comprising program code means which, when loaded into a processing means of an AR according to the ninth aspect and being installed in a radio access network, make said processing means execute at least one procedure realizing the method according to the second aspect of the invention.

In one embodiment, the computer program product includes a computer readable medium having said program code means stored thereon.

According to an eleventh aspect, the invention provides a UT for assisting a handover of a communication session from a first radio access point, AP1, to a second radio access point, AP2, in a radio access network, said UT comprising means realizing the method according to the fourth aspect of the invention.

In one embodiment, said means of the UT comprises a data memory having a first memory space with a first entrance forming a buffer memory for storing downlink packets addressed to said UT and a second entrance for storing a packet sequence number associated with at least one downlink packet, said data memory further having a second memory space with stored program code means which, when loaded in a processing means of said UT, make said processing means execute at least one procedure realizing said method.

In one embodiment, the UT is realised according to the IEEE 802 standard, being arranged to realise said method when said session is routed through a wireless data network according to the IEEE 802 standard, and further arranged to be authenticated by said wireless data network.

According to a twelfth aspect, the invention provides a computer program product comprising program code means which, when loaded into a processing means of the UT communicating with a radio access network, make said processing means execute at least one procedure realizing the method according to the fourth aspect of the invention.

In one embodiment, the computer program product includes a computer readable medium having said program code means stored thereon.

Even though the invention has been summarized above, the invention is defined by the accompanying claims.

BRIEF DESCRIPTION OF THE DRAWINGS

The features and advantages of the present invention will become more apparent from the following detailed description of the preferred embodiments with reference to the accompanying drawings, wherein.

DETAILED DESCRIPTION OF PREFERRED EMBODIMENTS

Now, with reference to FIGS. 2-6, the present invention shall be described in more detail.

Figure 1:
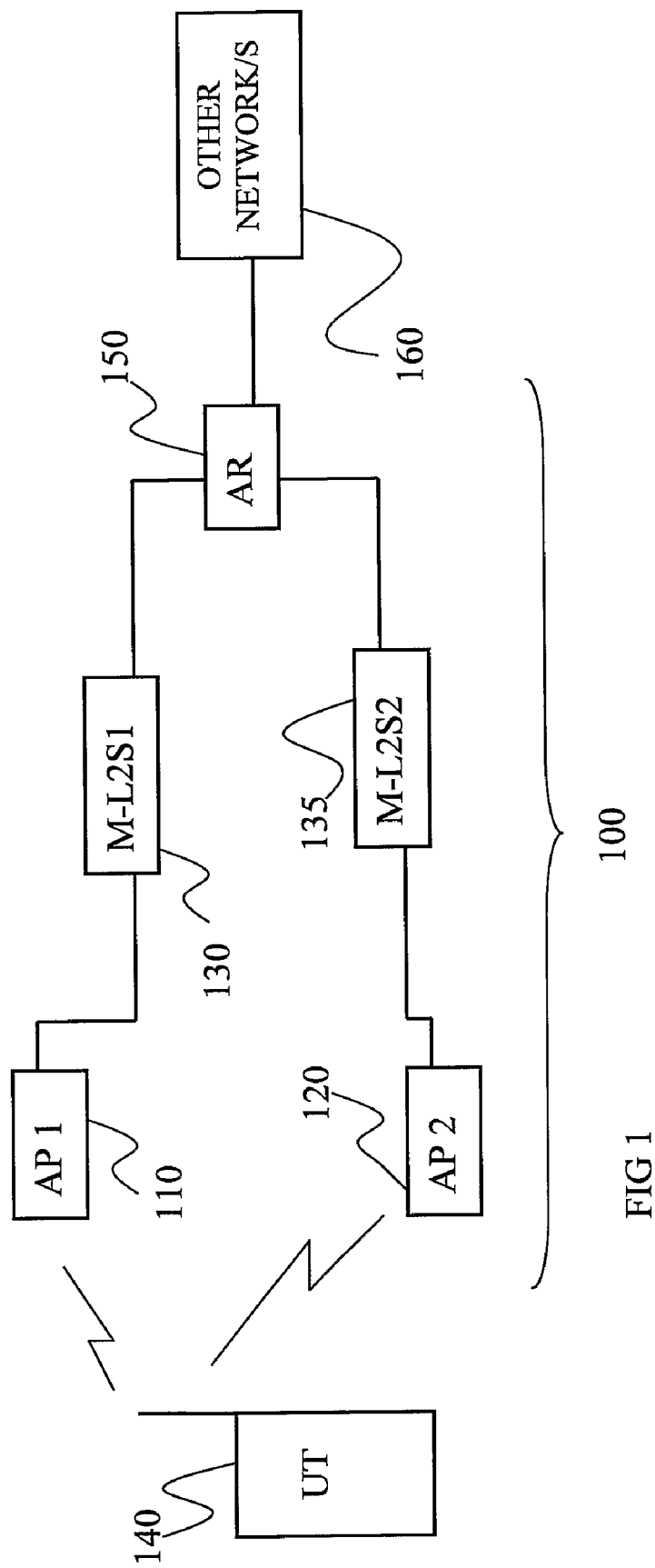
FIG. 1 illustrates a network architecture of a conventional radio access network in form of a WLAN.
Figure 2:
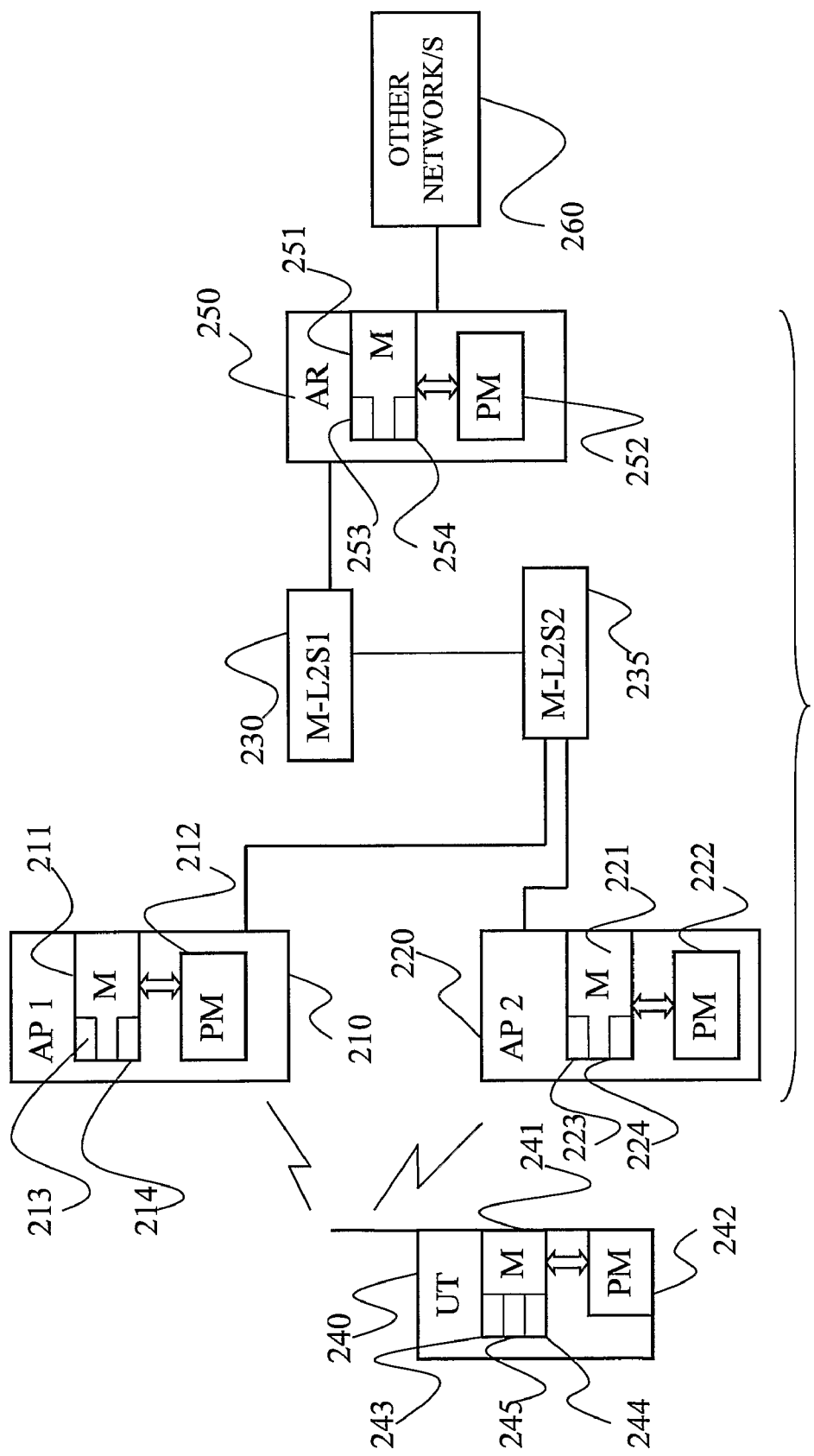
FIG. 2A illustrates a network architecture of a radio access network according to the present invention in form of a WLAN.
FIG. 2B illustrates an alternative network architecture of a radio access network according to the present invention in form of a WLAN.

In the FIGS. 1-6, corresponding elements have been given the same reference number along with a figure prefix number, e.g. AP1, 110, in FIG. 1 is referred to as AP1, 210, in FIG. 2 etc.

Figure 2A:
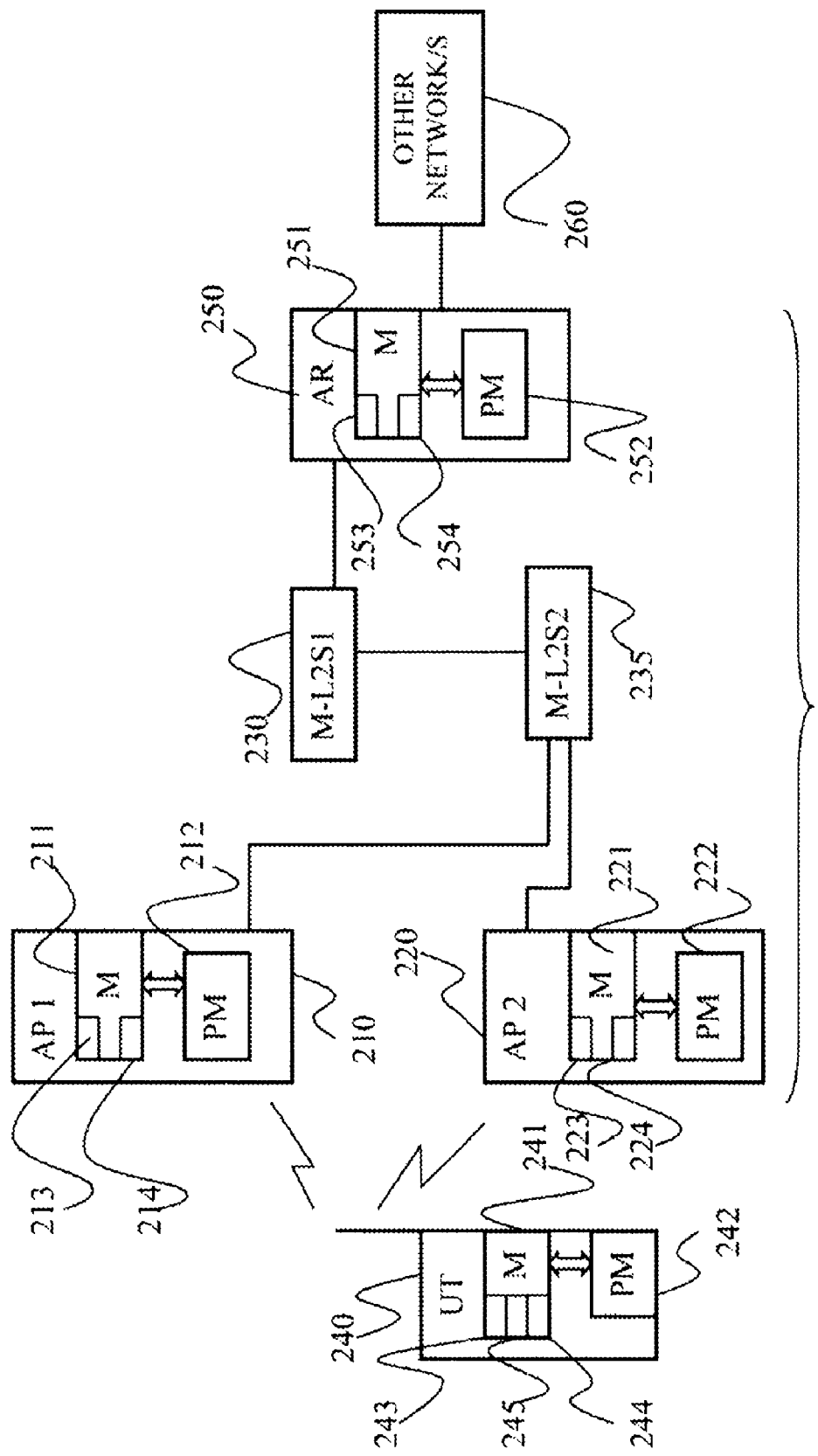

FIG. 2A depicts an illustrative example of a radio access network according to the present invention in form of a WLAN 200. The WLAN 200 comprises at least two radio access points, AP1, 210, and AP 2, 220, connected to an access router AR 250, optionally via conventional layer 2 switches M-L2S1, 230, and M-L2S2, 235, as illustrated in FIG. 2A. Many possibilities exist; the APs may e.g. be connected directly to AR 250. AR 250 may be connected to other ARs of the WLAN 200 (not illustrated in FIG. 2) and/or to other communication networks 260, such as e.g. the Internet and/or a 3GPP UTRAN. AP1, 210, and AP2, 220, have a respective conventional radio transceiver unit (not illustrated in FIG. 2) connected to a respective antenna, allowing a user terminal, UT, 240, to establish a radio link connection with AP1, 210, or AP2, 220, e.g. in form of a communication session with the WLAN 200. AP1, 210, AP2, 220, UT 240 and AR 250 have a respective conventional processing means, PM, 212, 222, 242 and 252, normally a CPU, arranged to read and write from/to a respective conventional data memory, M, 211, 221, 241 and 251, (e.g. RAMs) in a conventional manner exploiting a data/address/control bus. According to the invention, the respective data memory, M, 211, 221, 241 and 251 have a first memory space, 213, 223, 243 and 253, allocated with stored program code means which, when loaded into the respective processing means, 212, 222, 242 and 252, make said processing means realize the method according to various aspects of the invention, as described further below. According to the invention, the respective data memory, M, 211, 221, 241 and 251 have a second buffer memory space, 214, 224, 244 and 254, allocated, for temporary storage of data packets associated with the UT 240, as explained further below. The UT 240 has a conventional first buffer memory 245, normally a FIFO, in which data packets/frames demodulated by the radio receiver unit of UT 240 are temporarily stored before they are forwarded to a higher protocol layer or to the right higher level final application (e.g. an end user multi-media application such as VoIP, Voice over IP) by the LLC-protocol, in a conventional manner. It is to be understood that the WLAN in FIG. 2 is only an illustrative example and that the invention may be realized in any radio access network, such as a e.g. a 3GPP UTRAN, wherein a 3GPP radio base station Node B corresponds with AP1, 210, a 3GPP radio network controller, RNC, corresponds with AR 250 etc, as understood by a person skilled in the art. However, the invention is advantageously realized in wireless data networks according to the IEEE 802 standard protocol, such as e.g. Wireless Personal Area Networks (WPAN, IEEE 802.15), Wireless Metropolitan Area Networks (WMAN, IEEE 802.16), Mobile Broadband Wireless Access (MBWA, IEEE 802.20), Wireless Regional Area Networks (WRAN, IEEE 802.22) etc, exploiting the EAP authentication scheme which causes significant delays during handover, since the invention decreases packet delay during handover.

Figure 3:
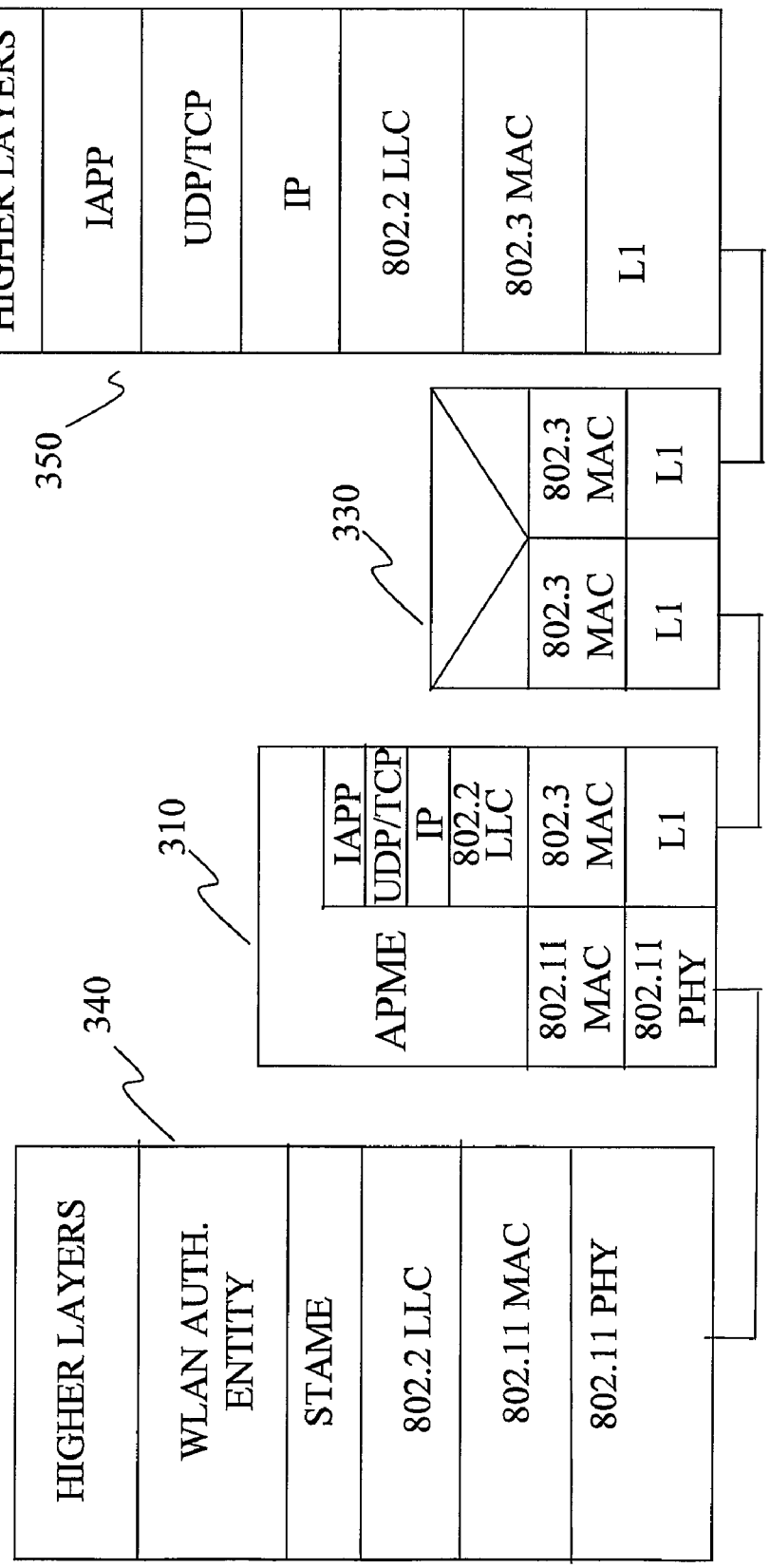
FIG. 3 is an illustrative example of the user plane and control plane protocol stack for the network in FIG. 2A, FIGS. 4A and 4B illustrate an example of the method according to some aspects the invention, in form of a flow chart diagram.

FIG. 3 illustrates an example of the user plane and control plane protocol stacks at UT, 240, AP1, 210, M-L2S1, 230 and AR, 250, in FIG. 2A. The protocol stack for M-L2S2, 235, is identical with the stack of M-L2S1, 230, and M-L2S2, 235, has therefore been left out in FIG. 3. The physical layer 1 in FIG. 3, L1, at AR 350, M-L2S1, 230 and AP1, 210, is a conventional Ethernet physical layer, above which a conventional WLAN-MAC layer is installed, i.e. the IEEE 802.3 MAC protocol, defining data ports for the various nodes in a conventional manner. The UT 340 and the AP1 310 have conventional IEEE 802.11 physical and MAC protocol layers installed, defining a physical radio link layer and data ports for UT 340 and AP1, 310, in a conventional manner. A conventional link control layer in the form of a IEEE 802.2 LLC-layer is installed above the MAC layer at UT 340, AP1, 310 and AR 350. The UT 340, AP1, 310, and AR 350 has further an IP protocol and a UDP/TCP protocol (not illustrated at UT 340) installed above the LLC layer. The UT 340 and AR 350 has further higher protocol layers/applications installed, such as e.g. a multi media application at UT 340 and packet handling applications (e.g. regarding tunneling, routing etc) at AR 350, in a conventional manner. The protocol layers allow the UT 340 and AR 250 to establish logical data connections by conventional protocol layer processing, as a person skilled in the art realizes. For instance, the MAC layer filters out packets intended for the physical device, the LLC layer forwards the packets to the "right" layer/application which in turn may forward the packet further up to a specific layer/application until it is received by the "right" final application or protocol layer. The Access Point Management Entity (APME) at AP1, 310, in FIG. 3 is not a layered protocol since it represents the main operational program of the AP1, 310, which implements AP manufacturer's proprietary features and algorithms, and incorporates the Station Management Entity (SME) of IEEE 802.11, e.g., the APME receives Association request messages from WLAN terminals (UTs) and takes further action accordingly. What is important is that the STAME application at UT 340 and PME application at AP1, 310, allow the UT 340 and AP1, 310 to exchange and interpret various control messages, e.g. regarding radio link measurement etc. The Inter Access Point Protocol (IAPP) as specified in IEEE 802.1. If standard is installed in all the AP's of the network, such as at the AP1, 310, and at AR 350, as illustrated in FIG. 3. The IAPP allows the AP1, 310 and AR 350 to communicate with each other, e.g. for signaling various control messages. The IAPP protocol also allows the AP1, 210 and AP2, 220, to communicate with each other, in a conventional manner. The IAPP entity requires UDP and TCP to distribute its messages as IP packets towards other IAPP entities, e.g. in order to notify a new association of a WLAN terminal at the AP1, 310. M-L2S1, 330, only functions as a relay of Ethernet frames to the destined stations or other L2 devices. The Ethernet frames may be unicast, multicast or broadcast frames. In one embodiment, the UT 340 has further a WLAN authentication entity installed, e.g. according to the 802.1X EAP/TLS/TTLS/PEAP standard, allowing UT 340 to communicate with a corresponding authentication entity of the WLAN, e.g. in form of a RADIUS or DIAMETER server connected to AP1, 310, for authentication purposes. The RADIUS or DIAMETER server may e.g. be integrated in AR 350, but many possibilities exist. Many other protocol options exist, as a person skilled in the art realizes, e.g. a LWAPP, (Light Weight Access Point Protocol), could be used instead of the IAPP, or RLC/RNC protocols could be used instead of the LLC/IAPP in case of a UTRAN etc. The RADIUS server normally exploits a conventional RADIUS protocol, e.g. as specified by the documents RFC 3579 (RADIUS support for EAP), RFC 2865, RFC 2869 (RADIUS Extensions), RFC 3576 (Dynamic Authorization Extensions to RADIUS) and RFC 3580 (IEEE 802.1X RADIUS Usage Guidelenes) and the DIAMETER server normally exploits a conventional DIAMETER protocol, e.g. as specified by RFC 3588 (DIAMETER Base Protocol), along with a conventional EAP (Extensible Authentication Protocol), e.g. as defined by standard AAA— (Authenticating, Authorization, Accounting) protocols RFC 2284—PPP EAP, RFC 4017 (EAP requirements for WLAN) or RFC 3748 (EAP) or RFC 2716 (PPP EAP TLS) or the EAP-TTLS (EAP Tunneled TLS Authentication Protocol), issued by the IETF standard organisation (Internet Engineering Task Force), and may further exploit the EAP-PEAP (Protected EAP Protocol), as a person skilled in the art realises.

Figure 4A:
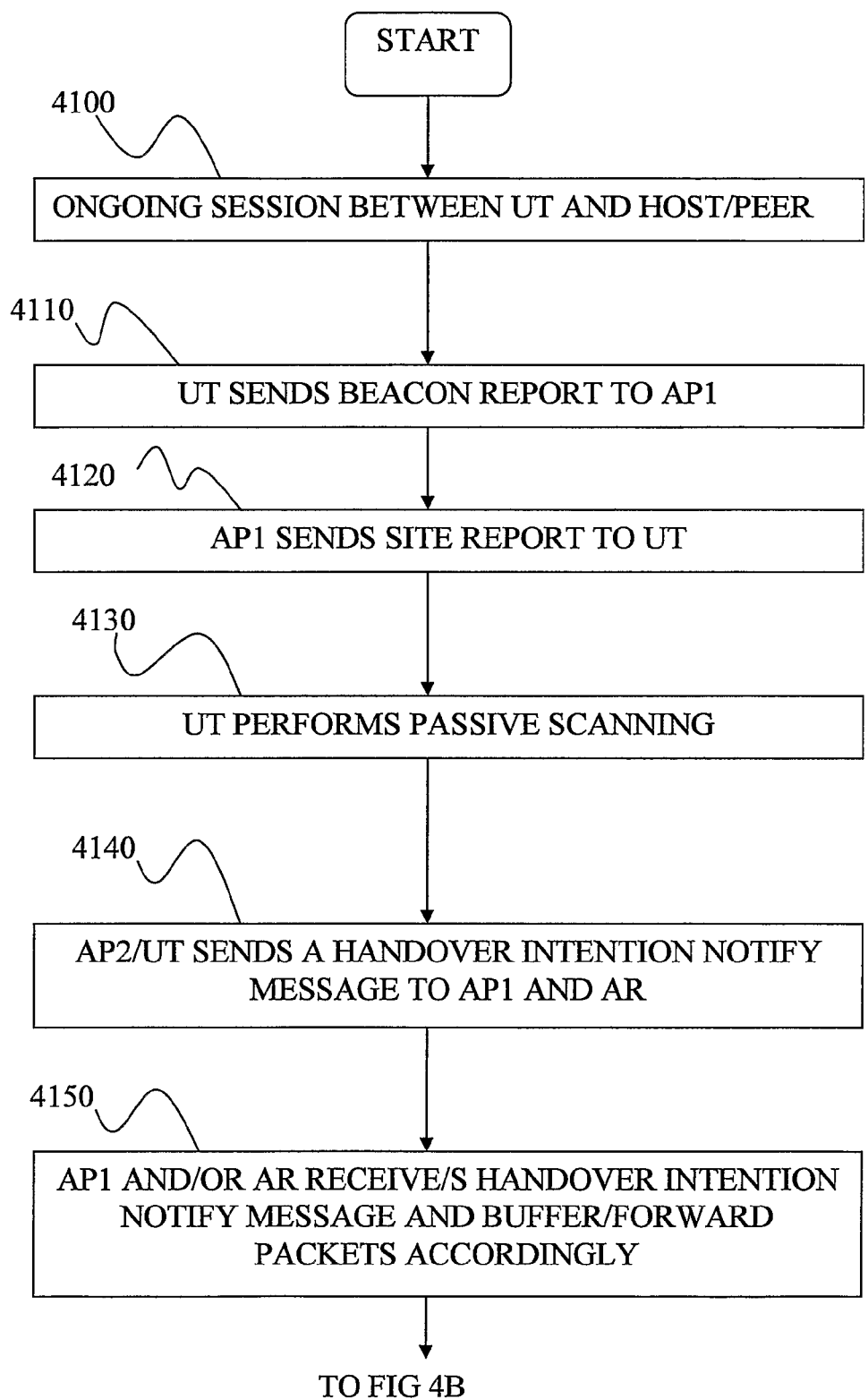
Figure 4B:
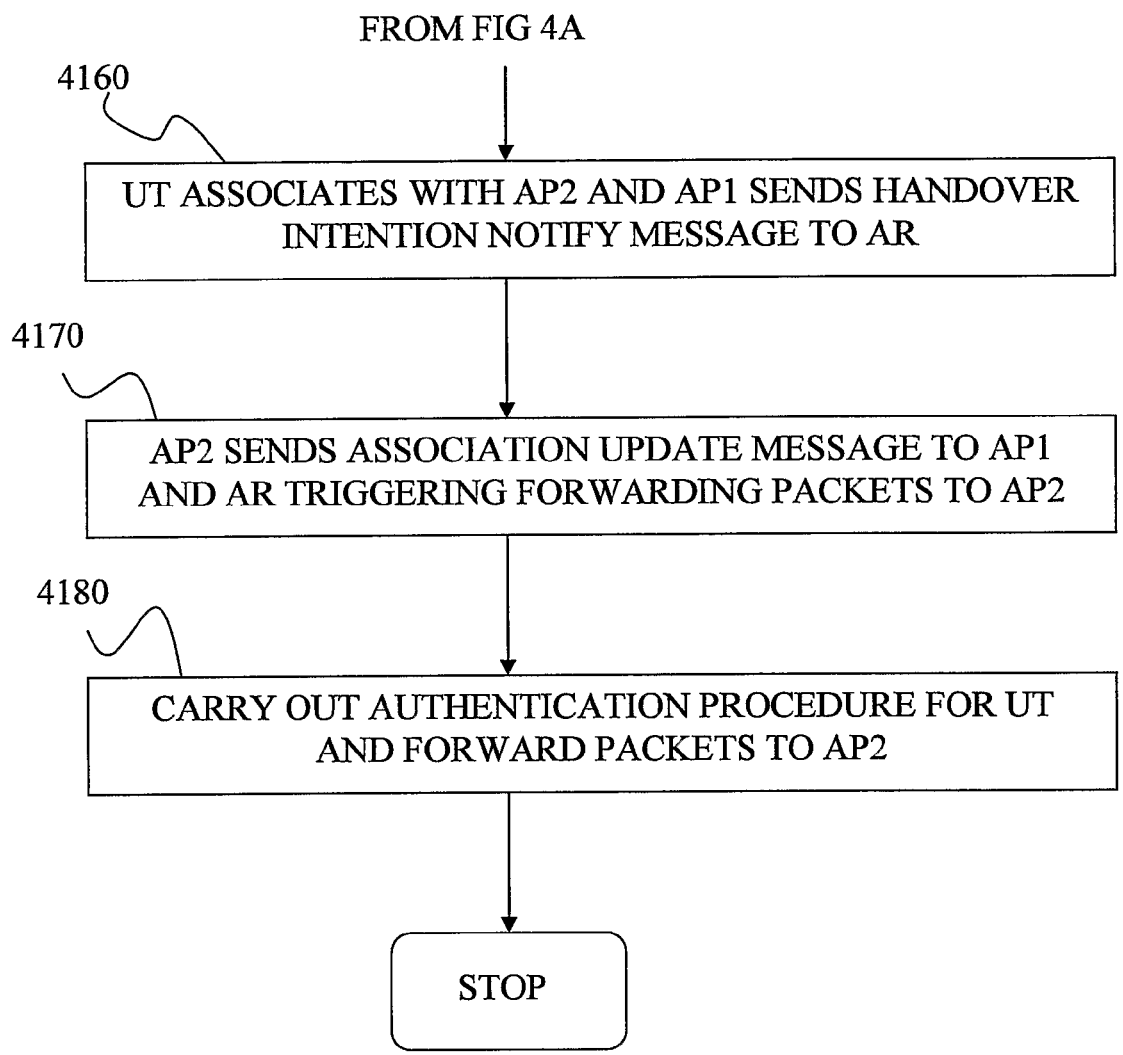
Figure 6A:
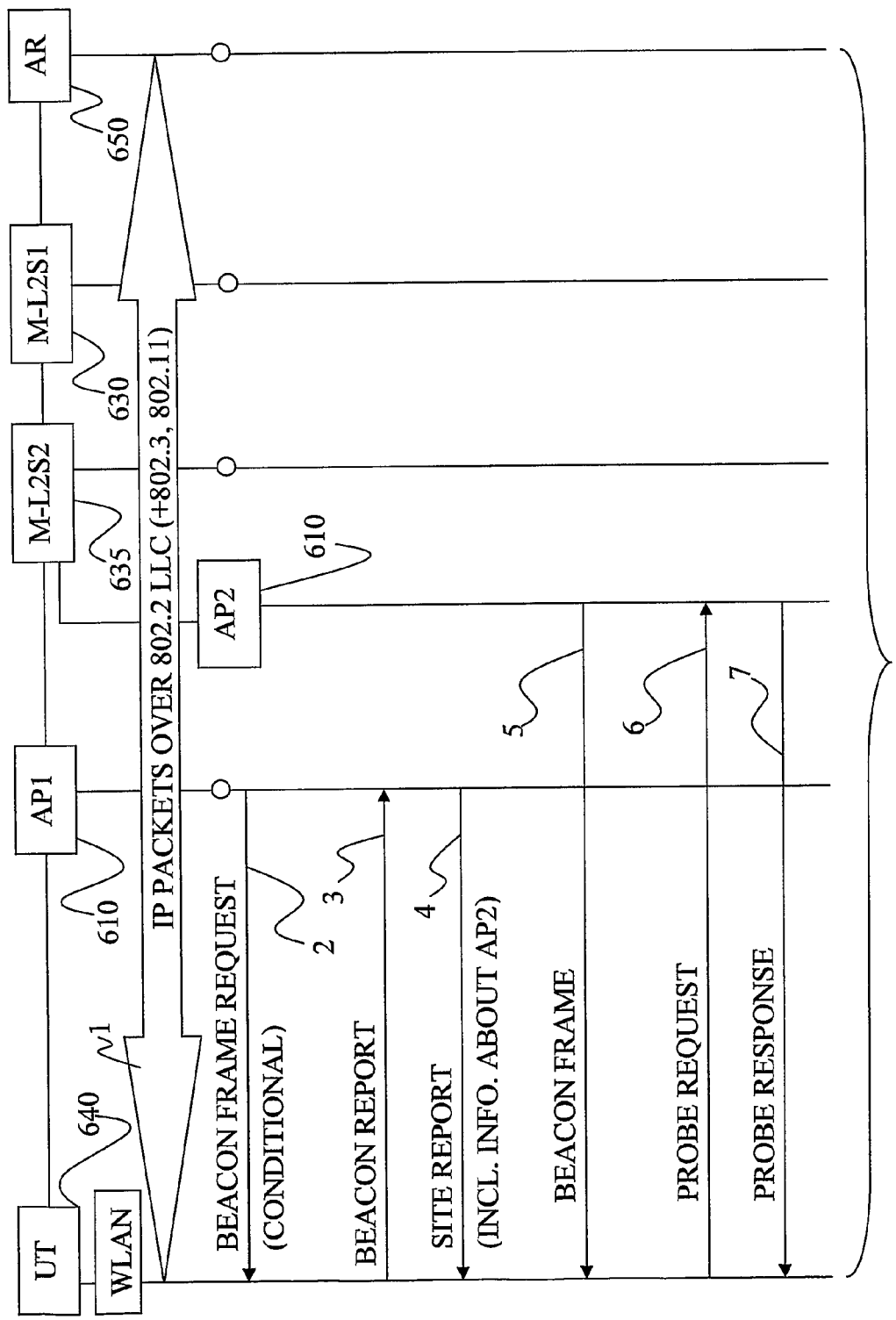
FIGS. 6A and 6B illustrate a signaling scenario for carrying out the method of the invention described in FIGS. 4A and B, in the network depicted in FIG. 2A.

Now, with reference to FIG. 4 and FIGS. 6A and B, the method according to the invention shall be described in more detail when realized in the network illustrated in FIG. 2A. It is assumed that each AP maintains its own up-to-date database containing information about the neighbor APs, whose coverage areas may overlap with its own (normally each AP has a stored list of the IDs, e.g. the WLAN MAC address, of all its neighboring APs. This way, each AP is capable to provide associated UTs with a site report according to IEEE 802.11k specification, which contains information about other APs in proximity to which the UT may roam (or handoff). This may only be achieved if all the involved APs are controlled by the same operator or if special inter-operator agreements exist.

In step 4100, there is an ongoing communication session between UT 240 and a Host/peer (e.g. on the Internet 260), wherein e.g. IP-packets are routed over the WLAN by means of the IEEE 802.2 LLC layer (and lower layers), as illustrated by step 1 in FIG. 6A. The communication session may e.g. be a conventional VoIP-session (Voice over IP). At any given time, once a WLAN connectivity between UT 240 and AP1, 210, is established, AP1, 210, sends a conventional conditional beacon frame request to UT 240, as illustrated by step 2 in FIG. 6A. The request indicates the reporting condition that a (periodical) beacon report for AP1, 210, should be sent by UT 240 to AP1, 210, when the average RCPI (Received Channel Power Indicator) level falls below a specified threshold value. The UT 240 then performs passive scanning and evaluates the current RCPI level continuously within certain measurement duration.

In step 4110 the reporting condition is met, (i.e. RCPI level below threshold is determined), and the UT 240 sends a conventional beacon report to AP1, 210, illustrated by step 3 in FIG. 6B, which thus estimates that the UT 240 will leave the coverage area of AP1, 210, soon and that a handover is to be effectuated. According to its own AP location database, AP1, 210, knows that its coverage area (partly) overlaps with the coverage area of one or some neighbor APs, including AP2, 220. However AP1, 210, may not be capable to determine whether or not UT 240 is currently within this overlap area.

In step 4120, AP1, 210 sends a conventional site report to UT 240, illustrated by step 4 in FIG. 6A, in order to support the UT 240 to carry out its handover procedure, which site report includes further information about AP2, 220, (i.e., its BSSID, PHY type, channel, etc.) and other neighbor APs. This site report informs the UT 240 about the registered neighbor APs, to which the UT 240 can associate according to the user's (subscription) profile. The UT 240 may also receive conventional broadcast beacon frames from APs that do not belong to the UT's 240 operator's network.

In step 4130, the UT 240 initiates a conventional passive scanning to find a suitable AP having an adequate RCPI level. By performing passive scanning, the UT 240 may or may not receive beacon frames from the listed neighbour APs, depending on the UT's, 240, geographical location. Assuming that UT 240 receives the beacon frames broadcasted by AP2, 220, as illustrated by step 5 in FIG. 6A, the UT 240 compares the RCPI level of AP2, 220, with the RCPI level of AP1 and decides to change the association from AP1, 210, to AP2, 220, if the RCPI level of AP2, 220, exceeds the RCPI level of AP1, 210, in a conventional manner, i.e. the UT 240 decides to carry out a handover from AP1, 210 to AP2, 220.

In step 4140, the UT announces the handover decision by sending a conventional standard Probe Request frame to AP2, 220, illustrated by step 6 in FIG. 6A. AP2, 220, responds with a conventional Probe Response frame, as illustrated by step 7 in FIG. 6A, which contains conventional detailed information about AP2, 220. According to the invention, the AP2, 220, then sends a handover intention notify message to AP1, 210, and/or AR 250, indicating a handover to AP2, 220, and comprising a session identifier uniquely identifying the communication session of UT 240. The handover intention notify message may also comprise identifiers uniquely identifying AP2, 220, and/or UT 240, e.g. the WLAN MAC address of AP2, 220 and/or UT 240, for reasons explained further below. The session identifier may e.g. be a conventional LLC-connection identifier or a conventional TCP/IP-flow identifier or the WLAN MAC address, or the IP-address, of UT 240. The handover intention notify message may e.g. be realized as a modified LAPP-PROBE. Notify packet, as illustrated by step 8 in FIG. 6B, which conventionally also includes the UT's WLAN MAC address, by adding said session identifier in a suitable data field or by simply defining the WLAN MAC address of UT 240 to be said session identifier, as understood by a person skilled in the art. The handover intention notify packet may in this case also have a defined handover identifier field, which may be set to "1" to indicate a handover intention and to "0" otherwise, in order to allow the receiving nodes to make a correct interpretation of the received message. However, the handover identifier may be left out and the receiving nodes (i.e. the AP1, 210 and AR 250) may be modified/arranged to interpret this handover intention notify message correctly even without such an identifier, as a person skilled in the art realises. This modified IAPP packet, which is sent as UDP/IP packet, is not defined in the IEEE 802.11f specification, but a person skilled in the art realizes how to realise such an LAPP packet given the described functionality above. The handover intention notify message, in form of the modified IAPP-PROBE. NOTIFY packet, is normally multicasted to a group address towards M-L2S2, but may alternatively be unicasted to AP1, 210, and/or AR 250, e.g. in case AP2, 220 knows that the session in question is currently associated with AP1, 210, (e.g. signaled by UT 240). The multicast address is according to the invention chosen in such a way that the neighbour APs (including AP1) and/or AR 250 receive/s the handover intention notify—IAPP packet. The handover intention notify message may alternatively be formed and sent by UT 240 to AP1, 210, which forwards it to the AR 250, but still other possibilities exist.

In step 4150, the AP1, 210, interprets the received handover intention notify message (e.g. in form of the modified IAPP-PROBE.Notify packet) as the intention of UT 240 to perform a session handover from AP1, 210, to AP2, 220. According to the invention, AP1, 210, then starts caching (buffering) the downlink IP packets addressed to UT, 240, in memory (213). This reduces the risk of packet loss and the necessary amount of re-transmitted packets, (and thereby the interference level and network signaling) at least in a statistical sense. In one embodiment, in case said handover intention notify message comprises an identifier uniquely identifying AP2, 220, e.g. the WLAN MAC address of AP2, 220, then AP1, 210 starts to forward packets to AP2, 220, immediately, as a response on receiving said handover intention notify message. This allows for a reduced packet delay and a "smoother" handover. According to an alternative embodiment, AP1, 210, continues to transmit downlink packets over its radio link to UT 240, and simultaneously forwards duplicate packets to AP2, 220, allowing a soft handover realisation. Furthermore, in step 4150, according to one embodiment of the invention, the AR 250 may start to buffer downlink data packets of said session (i.e. addressed to UT 240) in a buffer memory (253) instead of forwarding them to AP1 (210), as a response on receiving said handover intention notify message. This decreases the risk of packet delay/loss/retransmission and, in case the AR 250 forwards the downlink packets only to AP2, 220, also reduces the necessary buffer memory size at AP1, 210, as a person skilled in the art realises. In one embodiment, in case said handover intention notify message comprises an identifier uniquely identifying the AP2, 220, e.g. the WLAN MAC address of AP2, 220, the AR 250 immediately starts to route downlink packets of said session to AP2, 220, instead of AP1, 210. In an alternative embodiment, AR 250 starts to send downlink packets addressed to UT 240 to both AP1, 210, and AP2, 220, as a response on said handover intention notify message, allowing a soft handover (bi-casting) by duplicate transmission over the respective radio link of AP1, 210, and AP2, 220. This further reduces packet delays during the handover by means of a soft handover realisation.

Figure 5A:
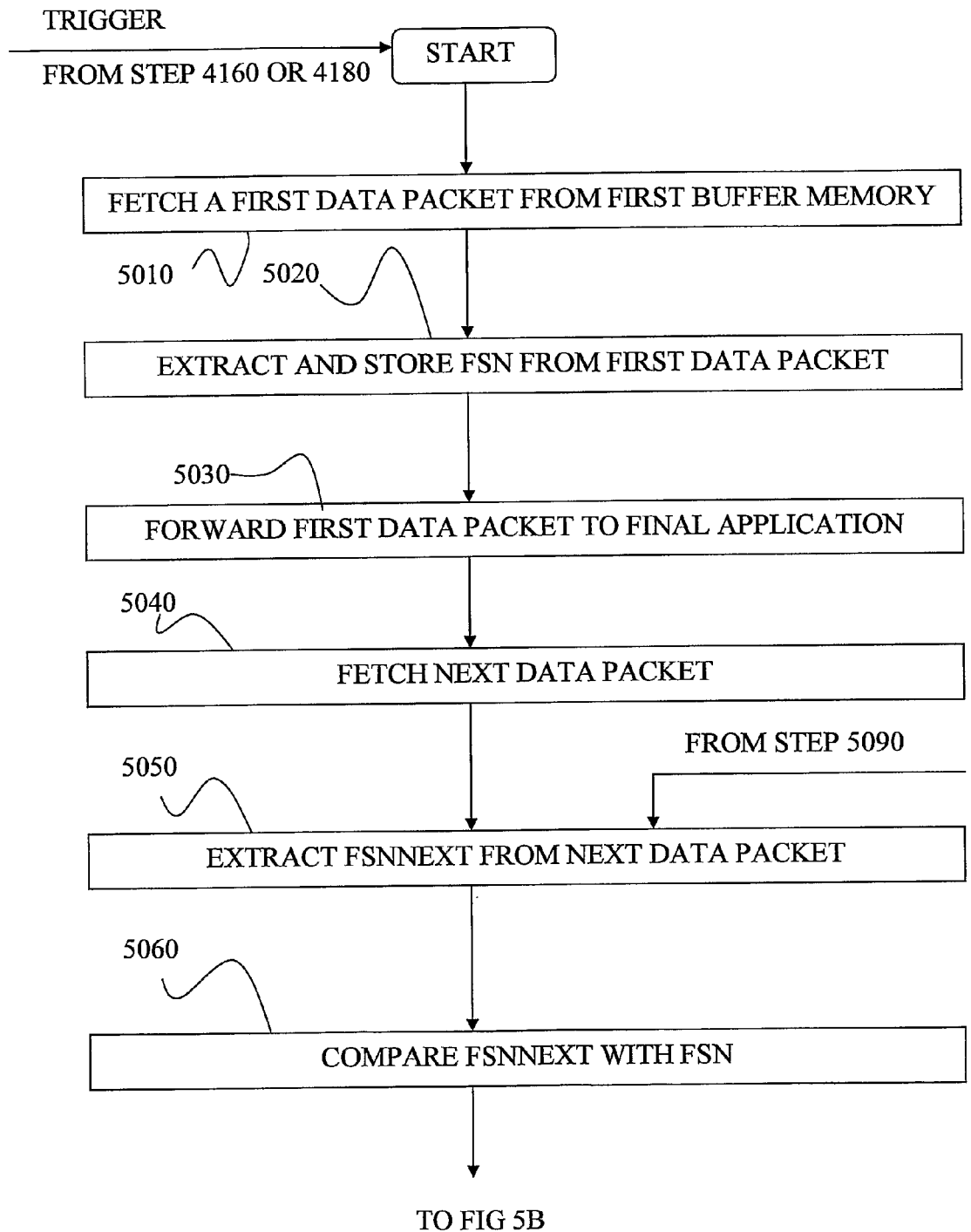
FIGS. 5A and 5B illustrate an example of an algorithm according to one aspect of the invention, in form of a flow chart diagram.
Figure 5B:
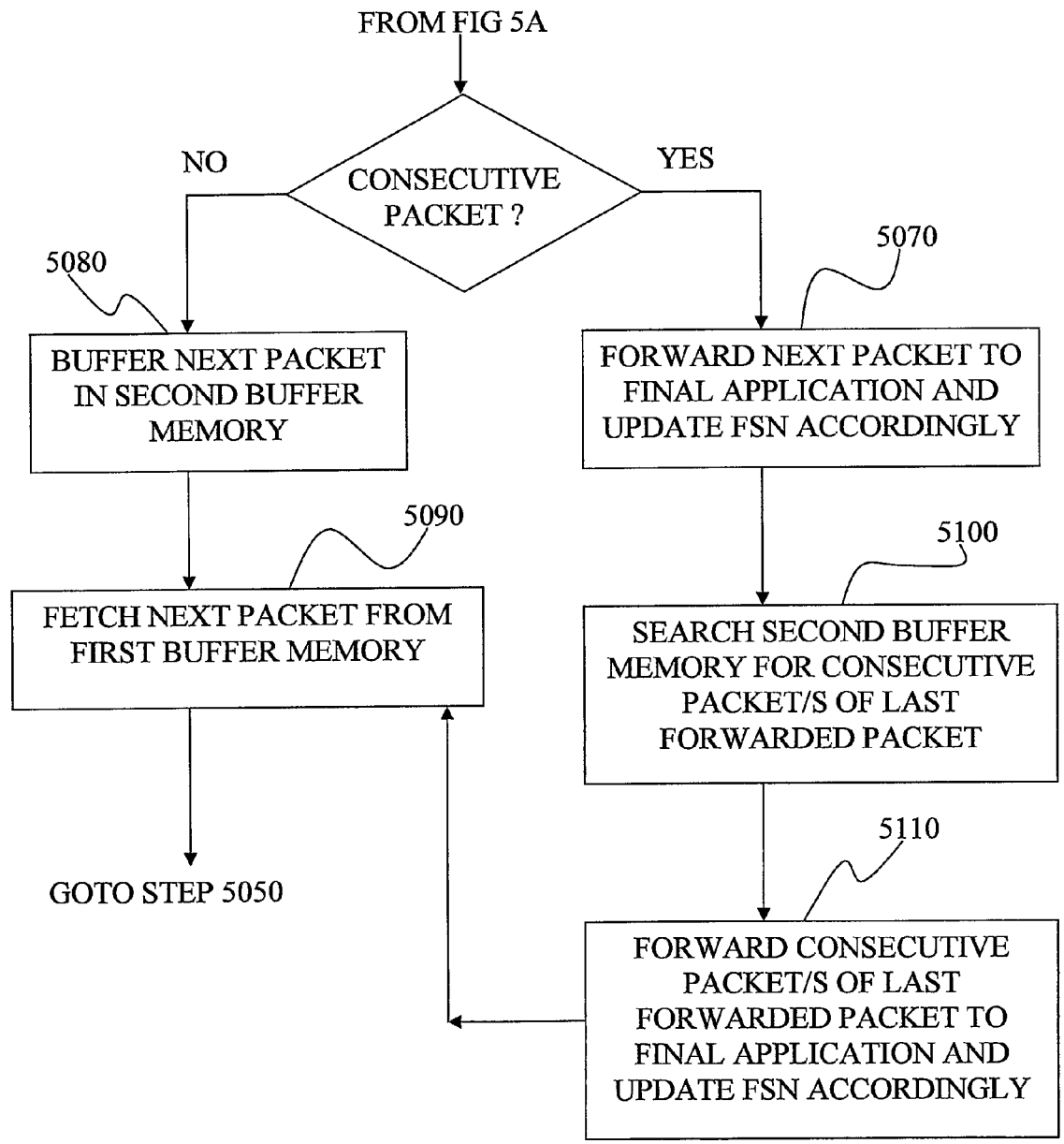
Figure 6B:
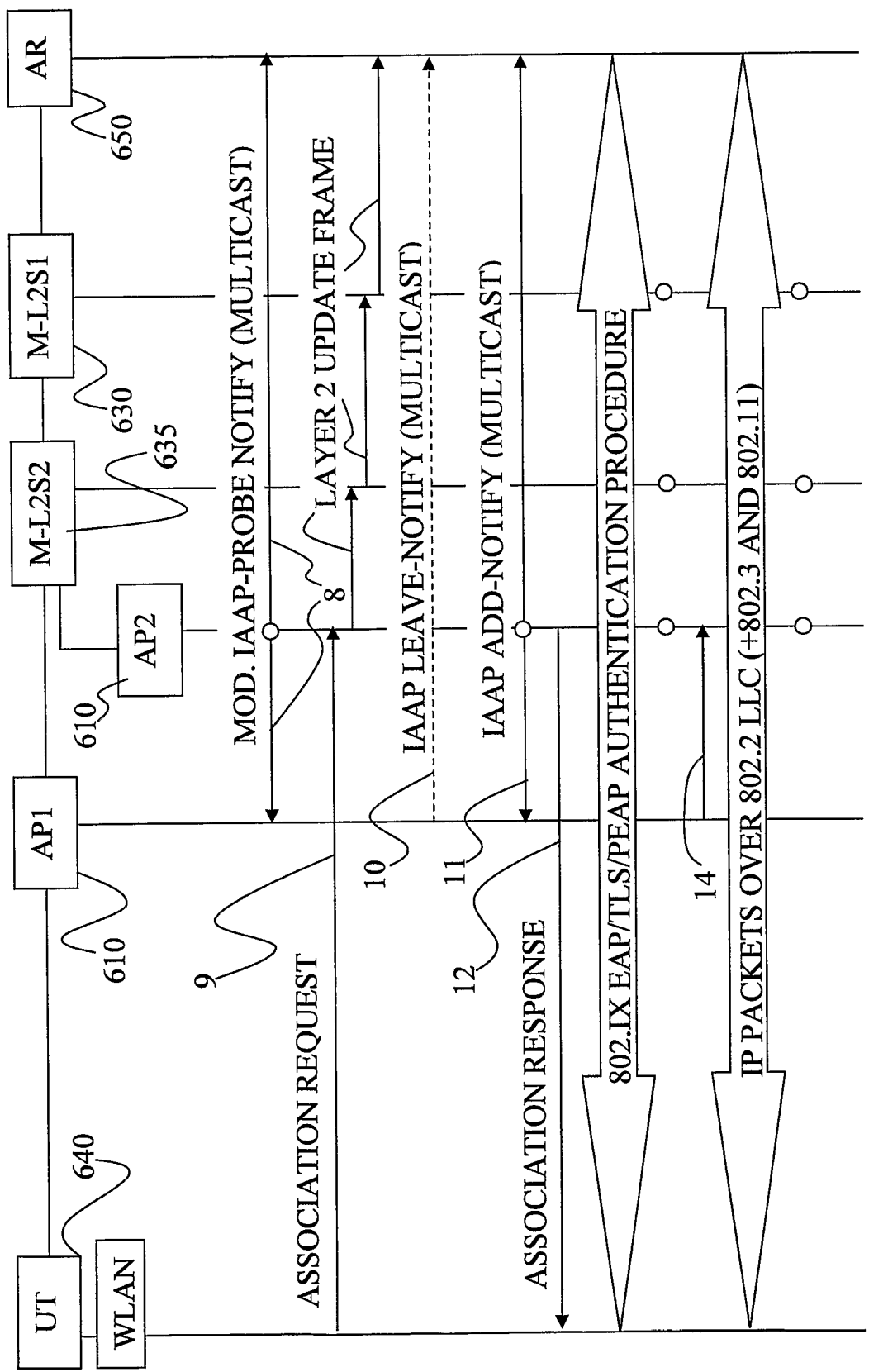

In step 4160, the UT 240 starts the (open system) EAP authentication procedure with AP2, 220, and sends a conventional Association Request frame to AP2, 220, as illustrated by step 9 in FIG. 6B. This triggers an abortion of the radio connectivity between UT 240 and AP1, 210, in a conventional manner. According to one embodiment of the invention, this also triggers a packet re-sequencing algorithm at UT 240, as illustrated in FIG. 5, and described further below. At the same time, since AP1, 210, does not receive any beacon reports from UT 240, the AP1, 210 sends after a certain pre-established time, T1, a handover intention notify message to AR 250, according to one embodiment of the present invention, e.g. in case AP1, 210, has not yet sent this message to AP2, 220. As already stated, the handover intention notify message comprises a session identifier, e.g. an LLC-connection identifier or IP-connection identifier or the WLAN address, or IP-address, of UT 240, uniquely identifying the data session and may be realized as above described modified IAPP PROBE Notify packet or e.g. as a modified IAPP-LEAVE.Notify packet, as illustrated by step 10 in FIG. 6B. A person skilled in the art realizes how form a handover intention notify message with the described functionality by modifying these IEEE 802 standard packets. This provides a possibility of early "warning" to the AR 250 that a handover is to be carried out so that the AR 250 may start buffer session downlink packets as early as possible, which reduces the overall packet delay/loss and network signaling, at least in a statistical sense. Thus, the AR 250 may receive a handover intention notify message from AP1, 210, and/or AP2, 220, and which message arrives first depends on network settings such as Ti etc. Alternately, a handover intention notify message, e.g. in form of a modified IAPP-LEAVE.Notify packet, may be sent from UT 240 to AR 250 via AP2, 220, in step 4140. Many possibilities exist.

In step 4170, when UT 240 has been associated with AP2, 220, AP2 multicasts an association update message, e.g. as a IAPP-ADD.Notify packet, as illustrated by step 11 in FIG. 6B, towards M-L2S2. The IAPP-ADD.Notify packet is sent as a multicast UDP/IP packet to notify other APs (e.g. AP1, 210) and AR 250 about the new association of the particular UT (UT 240 in this case) at the new target AP (i.e. AP2, 220). AP2, 220, concludes the association procedure by sending a conventional Association Response message to UT 240, as illustrated by step 12 in FIG. 6B. According to the invention, the IAPP-ADD.Notify packet includes a session identifier uniquely identifying the session in question and may also comprise a sequence number indicating the packet's validity, along with the WLAN MAC address of UT 240 and/or AP2, 220. The multicast IP (or MAC) address should be selected in such a way that only the AR 250 and other relevant APs (i.e. at least AP1, 210), which are geographically closely located to the sending AP2, 220, can receive the IAPP-ADD.Notify packet, in order not to introduce excessive signaling within the WLAN domain. The multicast IP (or MAC) address specified for the L2 update frame must be chosen in such a way that intermediate M-L2Ss and AR 250 can receive it to allow them to update their bridging table, if necessary. In accordance with its multicast IP (or MAC) address the IAPP-ADD.Notify packet will be received by AP1, 210, and AR, 250. Since AP2, 220, is connected to the same M-L2S as AP1, 210, M-L2S1, 230, and AR, 250, need not update their bridging tables. This means that AR, 250, will continue to forward all downlink IP packets for UT 240 through M-L2S1, 230, and M-L2S2, 235, as it did before receiving the L2 update frame and/or LAPP-ADD.notify packet. According to the invention, the AP1, 210, and AR 250 starts to forward downlink packets for said session to AP2, 220, after having received this IAPP-ADD.Notify packet. This reduces the risk of packet delay/loss and the signaling within the WLAN during the handover, thereby providing a more "smooth" handover. It shall be understood that the present invention may be realised by means of (optionally) modified IAPP-MOVE.Notify packet/s along with IAPP-MOVE RESPONSE.Notify packet/s and/or by means of (optionally) modified IAPP-CASH.Notify packet/s along with IAPP-CASH-.Response packet/s, instead of the above described (optionally) modified IAPP-ADD.notify packet/s, as a person skilled in the art realises. The IAPP-MOVE.Notify packet is then preferably unicasted by AP2, 220, to AP1, 210, (as a dedicated message), further decreasing network signaling.

In step 4180, after that the AP2, 220, has sent the conventional Association Response in step 4170, the conventional 802.1X (EAP) based authentication is then carried out between UT, 240, AP2, 220 and the network authentication entity (e.g. a RADIUS entity integrated in AR 250), as illustrated by step 13 in FIG. 6B. Downlink and uplink IP packets can be sent over the radio link between UT 240 and the AP2, 220, as soon as the EAP authentication procedure is completed. Meanwhile, in step 4180, AP2, 220, receives session downlink packets from AR 250 and/or AP1, 210, and buffers them in memory 223. All session downlink IP packets (encapsulated as LLC/Ethernet frames), that are still cached in AP1, 210, and/or not yet transmitted to or acknowledged by UT 240, can be sent directly to AP2, 220, as illustrated by step 14 in FIG. 6B, or alternatively, removed since their re-transmissions, if necessary, can be conducted between UT 240 and AR 250 through AP2, 220. This forwarding procedure is thus carried out while the EAP authentication between UT 240 and AP2, 220, and the network authentication entity, is still ongoing since both procedures are independent to each other. Since M-L2S2 has already updated its bridging table, according to their destination MAC address (i.e., UT's WLAN MAC address) the LLC/Ethernet frames can be forwarded through the specified port of M-L2S2, 235, to which AP2, 220, is connected. The forwarded packets should not be routed through M-L2S1, 230. The LLC/Ethernet frames forwarded by AP1, 210, and AR 250 via M-L2S1, 230 (including new downlink packets), are according to the invention cached in memory 223 at AP2, 220, and transmitted to UT 240 immediately after the EAP authentication procedure is completed. Memory 223 may be a FIFO memory, first in first out, so that a reordering of the downlink LLC/Ethernet frames must be performed by an algorithm residing at the LLC layer of UT 240, according to the invention. This solves problems regarding the TCP interpreting packets out of order as network congestion, and provides a "smoother" handover, especially important for real time applications such as VoIP. The session handover is concluded after both uplink and downlink IP packets can be exchanged as LLC/Ethernet frames between UT 240 and AR 250 through AP2, 220, and the corresponding M-L2Ss, as illustrated by step 15 in FIG. 6B. According to one embodiment of the present invention, the completion of the EAP authentication procedure triggers a packet re-sequencing algorithm of UT 240, as illustrated and described further with reference to FIG. 5.

Figure 2B:
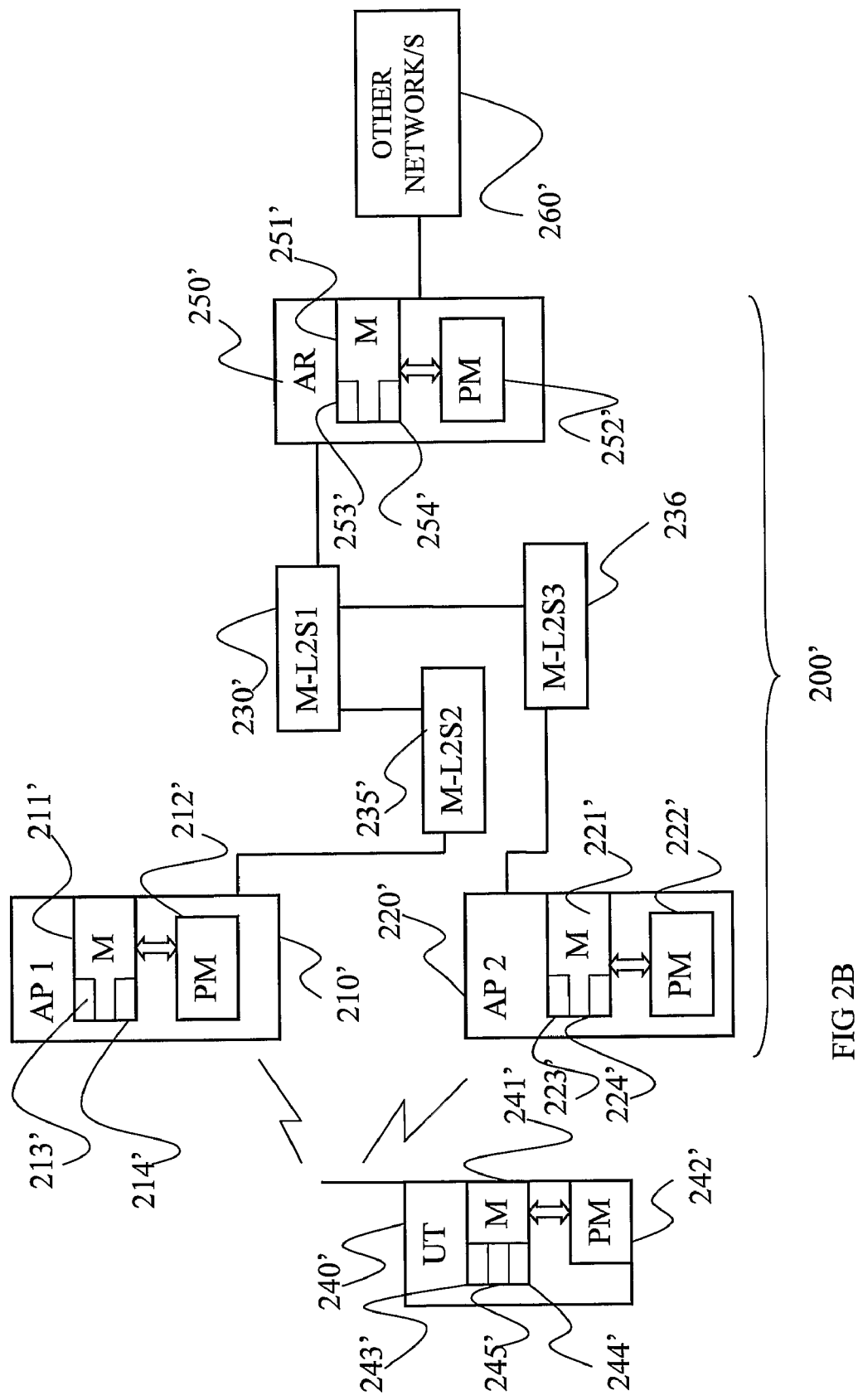

FIG. 2B illustrates another example of a network architecture for which the invention is applicable. In FIG. 2B, we may consider a session wherein the UT 240 is currently associated with AP1, 210', (i.e., old AP) and the IP packets, that are encapsulated as LLC/Ethernet frames, are being exchanged between UT 240' and AR 250' through the WLAN transmission path. The link between AP1, 210', and AR, 250', is thus bridged by two M-L2Ss, i.e., M-L2S1, 230', and M-L2S2, 235'. In contrast to the previous HO-1 scenario described with reference to FIG. 2A, AP2, 220', is connected to a different M-L2S, i.e., M-L2S3, 236. However, both layer 2 switches, i.e., M-L2S2, 235', and M-L2S3, 236', are connected to the same AR, 250', via M-L2S1, 230'. The coverage areas of AP1, 210', and AP2, 220', are assumed to be (partly) overlapped and we consider a situation where UT 240' is going to hand off its current data session from AP1, 210', to AP2, 220', (i.e., new AP).

In general, the session handover procedure for the network in FIG. 2B is quite similar with the one illustrated in FIG. 2A. The main differences between the procedures relate to steps 4140 and 4170, in the following way:

In step 4140: UT 240' sends a Probe Request frame to AP2, 220', to "announce" its intention to perform handover to AP2, 220'. After responding with a Probe Response frame, AP2, 220', sends the (non-standard) IAPP-PROBE.Notify packet, which includes the UT's 240' WLAN MAC address, to a multicast group address towards M-L2S3, 236. The multicast address should be chosen in such a way that AP1, 210', (in general the neighbour APs) and AR, 250', receives the IAPP packet after it is routed through M-L2S3, 236, M-L2S1, 230', and M-L2S2, 235'. AP1, 210', interprets the received IAPP-PROBE.Notify packet as the intention of UT 240' to perform a session handover from AP1, 210', to AP2, 220'. AP1, 210', then starts caching the downlink IP packets for UT, 240', which will be forwarded to AP2, 220', as soon as the handover takes place. The AR, 250', may use the information provided in the IAPP-PROBE.Notify packet to make its own decision whenever it receives an IAPP-LEAVE.Notify packet, which includes the UT's WLAN MAC address.

In step 4170: After UT, 240', is successfully associated with AP2, 220', AP2, 220', multicasts the layer 2 update frame and the corresponding IAPP-ADD.Notify packet towards M-L2S3, 236. The multicast MAC address of this L2 frame is chosen in such a way that M-L2S1, 230', AR, 250', and M-L2S2, 235', (and other L2 devices between them) can receive the L2 frame and update their bridging table. In accordance with its multicast IP address the IAPP-ADD.Notify packet will be received by AP1, 210', and AR, 250'. Since AP2, 220', is connected to the same AR, 250' as AP1, 210', i.e., via M-L2S1, 230', no update of AR's, 250', bridging table is necessary (an update is required at M-L2S3, M-L2S 1 and M-L2S2). This means that AR, 250', will continue to forward all the downlink IP packets for UT, 240', through M-L2S1, 230', which now routes the packets through M-L2S3, 236, (instead of M-L2S2, 235').

Furthermore, AP1, 210', may optionally forward all UT downlink IP packets (encapsulated as LLC/Ethernet frames), that are still cached in AP1, 210', and/or not yet acknowledged, to AP2, 220', through the switches M-L2S2, 235', M-L2S1, 230', and M-L2S3, 236. This is possible because all these three L2 switches have already updated their bridging tables, and can therefore route the LLC/Ethernet frames based on its specified destination MAC address (i.e., UT's WLAN MAC address).

The present invention provides a packet re-sequencing algorithm for UT 240, the working method of which shall now be described in more detail, with reference to FIG. 5. The re-sequencing algorithm normally resides at the LLC layer of UT 240 and is advantageously triggered by any conventional authentication procedure taking place between the UT 240 and the radio access network 200. For instance, the re-sequencing algorithm may be triggered by the UT 240 sending a conventional Association Request frame to AP2, 220, as described in association with step 4160 above, or e.g. by the completion of the EAP authentication procedure in step 4180, described above. Since the re-sequencing algorithm according to the invention reduces packet delay (reduced packet loss), it is advantageously used in combination with an authentication procedure, which itself is time consuming. Alternatively, the re-sequencing algorithm may be triggered by a handover decision taken by a suitable network node such as AP1 (210) or AP2 (220) or AR, 250, in the network of FIG. 2A, and signaled to UT 240, or taken by UT (240). Many possibilities exist and it is obvious for a person skilled in the art how to realize such a triggering.

In step 5010, a first data packet addressed to said UT (240) and received from AP1 (210) is fetched in a conventional manner from the first buffer memory 245 of UT 240 in which demodulated packets received over the radio link are temporarily stored before being forwarded to the "right" final higher level application, e.g. a real time multi-media application or a VoIP application. Since the re-sequencing algorithm is triggered before the AP2, 220, has started to transmit downlink packets to the UT 240, the algorithm interprets any (i.e it fetches the first "packet in the queue") data packet in said first buffer memory 245 as being a packet from AP1, 210.

In step 5020, a frame sequence number, FSN, is extracted from said first data packet, and said FSN is stored in a first memory space of a second buffer memory 243 of said UT 240. The first and second buffer memories may be physically separated memories, e.g. FIFOs, or may be defined by having different memory spaces allocated in e.g. a RAM 241 of said UT 240, but many possibilities exist. FSN may e.g. be a conventional LLC frame sequence number defined by the LLC protocol or a conventional IP-packet sequence number defined by the IP- or IPSec- or mobile IP-protocol or a conventional TCP- or SCTP (Stream Control Transmission Protocol) frame sequence number. The term "frame sequence number" shall here be interpreted to be any conventional sequence number identifying a packet or the payload thereof.

In step 5030, said first packet is forwarded to a higher protocol layer, e.g. to "the right" final application running on said UT (240), e.g. a real time VoIP-application, in a conventional manner, as explained above.

In step 5040, the next data packet addressed to said UT (240) is fetched from said first buffer memory 245.

In step 5050, the frame sequence number of said next data packet, FSNNEXT, is extracted.

In step 5060, it is established whether said next packet is a consecutive packet of the last packet forwarded to the higher protocol layer/final application, referred to as "last forwarded packet" by comparing said FSNNEXT with said FSN. In case of extracted LLC packet sequence numbers, the "next packet" is a consecutive packet of the "last forwarded packet" if FSNNEXT=FSN+1, in case of extracted TCP frame sequence numbers, the "next packet" is a consecutive packet of the "last forwarded packet" if FSNNEXT=FSN+ e.g. 1460, since a commonly used segment size of TCP-packets comprise 1460 payload frames. The invention is however applicable for any segment size/s and a person skilled in the art knows how to realize said comparison in order to establish whether said "next packet" is a consecutive packet of said "last forwarded packet" or not. If it is established that said "next packet" is a consecutive packet of said "last forwarded packet", then the algorithm proceeds to step 5070, otherwise it proceeds to step 5080.

In step 5070, said "next packet" is forwarded to a higher protocol layer/final application of UT 240 and the value of said FSNNEXT is stored in said first memory space of the second buffer memory (243). In one embodiment, said FSN is simply overwritten in said memory 243, thereby minimizing the required size of memory 243. The stored FSNNEXT value thus forms an updated FSN value for future frame sequence number comparisons in order to identify a consecutive packet of said "next packet" and so on. The algorithm then proceeds to step 5100.

In step 5080, said "next packet" is buffered in a second memory space of said second buffer memory 243. Advantageously, said "next packet" is stored in a list in said second buffer memory 243 on a row corresponding to the difference of FSN and FSNNEXT. For instance, in case of extracted LLC sequence numbers, if said difference is 3, then the "next packet" will be stored on the 3:rd row in this list, thereby minimizing the retrieval time when fetching packets from said second buffer memory 243 at a later stage, since the packets are stored in their correct consecutive order in said list. The re-sequencing algorithm according to the invention normally limits the required size of said second memory space of said buffer memory 243. This can be achieved e.g. by defining a threshold level size of said second memory space of memory 243 and forwarding the stored in front packet (i.e. the packet with the lowest frame sequence number) from said second memory space of buffer memory 243 before buffering the "next packet" in step 5080, if said threshold size have been reached. Another possibility is to buffer the "next packet" for a defined maximum time period after which the "next packet" is simply being forwarded to a higher protocol layer/final application. The "next packet" would then be associated with a specific packet timer when it is stored in the second memory space of buffer memory 243 and forwarded from said second memory space when said packet timer elapses (i.e. when the storage time of the "next packet" in said second memory space exceeds said maximum time period). A person skilled in the art realizes how to realize such memory limitations. This memory limitation is advantageous since it also hinders the blocking of the algorithm, as a person skilled in the art realizes. The algorithm then proceeds to step 5090.

In step 5090, the further next data packet is fetched from the first buffer memory 245, which packet is treated as above "next packet". The algorithm then returns to step 5050.

In step 5100, the second memory space of said second buffer memory 243 is searched in order to find a consecutive data packet, or a cluster of consecutive packets, of the "last forwarded packet" (e.g. forwarded to a real time VoIP application). The search is carried out by checking the (suitable) respective frame 10 sequence number of the stored packets, and comparing these with the frame sequence number of the "last forwarded packet". If such a consecutive packet is found, or a cluster of such consecutive packets, this packet, or cluster of packets, is/are forwarded to a higher protocol/final application (e.g. a real time application such as VoIP) in step 5110 and the corresponding "latest" frame sequence number of the last forwarded packet is stored in the second memory space of said second buffer memory 243, i.e. FSN is updated accordingly, and the algorithm continues to step 5090. If no such a consecutive packet is found, or a cluster of such consecutive packets are found, after having searched through the second buffer memory, the algorithm then proceeds to step 5090. Since the receiver, i.e. the higher layer protocol/final application of UT 240, thus receives less packets out of order in this way, the invention reduces the number of necessary re-transmissions and interference level in the network and also reduces the risk of a reduced data rate, e.g. in the case of a TCP communication session, at least in a statistical sense. Since the invention reduces packet delay during handover, it is particularly advantageous for real time applications, such as e.g. VoIP, especially if an authentication procedure is to be carried out during the handover, such as an EAP procedure between UT 240 and AP2, 220.

The method and algorithm according to the present invention is normally realized by means of software programs comprising code means which, when loaded in the processing means 252,212, 222 and 242 of the AR 250, AP1, 210, AP2, 220 and UT 240 realize said method and/or algorithm. The software programs may be stored on e.g. CD-ROMs, flash memories, etc. allowing an efficient distribution/installation. The principles of the present invention have been described in the foregoing by examples of embodiments or modes/examples of operations, i.e. in the case of a WLAN. However, as already stated, the invention is applicable for any radio access network and many modifications and/or combinations are possible. Therefore, the invention should not be construed as being limited to the particular embodiments/working examples discussed above, and it should be appreciated that variations may be made in those embodiments/working examples by persons skilled in the art, without departing from the scope of the present invention as defined by the appended claims.

The invention claimed is:

1. A method for assisting a handover of a user terminal's (UT's) communication session from a first radio access point (AP1) to a second radio access point (AP2) in a radio access network, said method to be carried out by said UT comprising the following steps:
   a) establishing that said communication session is to be handed over from said AP1 to said AP2,
   b) fetching a first packet from a first buffer memory of said UT,
   c) extracting a frame sequence number (FSN) from said first packet and storing said FSN in a first memory space of a second buffer memory of said UT,
   d) forwarding said first packet to an application running on said UT or to a higher level protocol of said UT, e) fetching a next packet from said first buffer memory, said next packet being the next packet received by said UT after said first packet, f) extracting a frame sequence number from said next packet (FSNNEXT), g) establishing whether said next packet is a consecutive packet of said first packet by comparing said FSNNEXT with said FSN, and, h) storing said FSNNEXT in said first memory space of said second buffer memory and forwarding said "next packet" to a higher level protocol or a final application if it was established in step g) that said "next packet" is a consecutive packet of said first packet, and otherwise buffering said "next packet" in a second memory space of said second buffer memory.

2. The method according to claim 1 wherein the step a) of establishing that said communication session is to be handed over from AP1 to AP2, comprises any of the following steps:

a de-association of AP1, or, an association of AP2, or, a handover decision taken by UT according to a certain handover criterion, or, a handover decision according to a certain handover criterion taken by a network node and signaled to said UT.

3. The method according to claim 1 further comprising the step of:

limiting the size of said second memory space of said second buffer memory by defining a maximum threshold number of stored packets/bytes for said second memory space or defining a maximum allowable storage time for a packet being stored in said second memory space.

4. The method according to claim 1, wherein data packets received from one or more of AP1 and AP2 are stored in received chronological order in said first buffer memory, said memory being of a first-in-first-out (FIFO) type, wherein said steps a) and e) of fetching a first and second data packet comprise the step of:

reading a data packet from said FIFO memory.

5. The method according to claim 1 further comprising the steps of:

reading a third data packet from said first buffer memory, said memory being of a first-in-first-out (FIFO) and establishing that said third data packet is a consecutive data packet of the data packet being the last packet forwarded to said application, forwarding said third data packet to said application and updating the first memory space of said buffer memory with the frame sequence number of said third data packet, establishing that there is at least one stored data packet in said second memory space of said second buffer memory, searching said second memory space of said buffer memory for a consecutive data packet of said third data packet.

6. The method according to claim 1 wherein said radio access network is a wireless data network according to the IEEE 802 standard and wherein said method further comprising the step of:

sending and receiving authentication credentials to/from AP2, for instance according to the EAP standard.

7. A UT for assisting a handover of a communication session from a first radio access point (AP1) to a second radio access point (AP2) in a radio access network, said UT comprising means realizing the method according to claim 1.

8. The UT according to claim 7 wherein said means comprises a data memory having a first memory space with a first entrance forming a buffer memory for storing downlink packets addressed to said UT and a second entrance for storing a frame sequence number associated with at least one downlink packet, said data memory further having a second memory space with stored program code means which, when loaded in a processing means of said UT, make said processing means execute at least one procedure realizing said method.

9. The UT according to claim 7 realized as a UT according to the IEEE 802 standard, being arranged to realize said method when said session is routed through a wireless data network according to the IEEE 802 standard, and wherein said UT is further arranged to be authenticated by said wireless data network.

10. A computer program product comprising program code which, when loaded into a memory of a UT communicating with a radio access network, make a processor of the UT execute at least one procedure realizing the method according to claim 1.

11. A computer program product according to claim 10 including a non-transitory computer readable medium having said program code stored thereon.

* * * * *

UNITED STATES PATENT AND TRADEMARK OFFICE
CERTIFICATE OF CORRECTION

PATENT NO.       : 8,050,232 B2
APPLICATION NO.  : 11/996673
DATED            : November 1, 2011
INVENTOR(S)      : Sachs et al.

It is certified that error appears in the above-identified patent and that said Letters Patent is hereby corrected as shown below:

On the Cover Page, item (57), under "ABSTRACT", in Column 2, Line 13, delete "realizing" and insert -- realized --, therefor.

Delete Figure 2, Sheet 2 of 11 of the Issued Patent.

In Column 1, Line 35, delete "AP11 10" and insert -- AP1 110 --, therefor.

In Column 7, Line 20, delete "AP 2," and insert -- AP2, --, therefor.

In Column 8, Line 40, delete "PME" and insert -- APME --, therefor.

In Column 9, Line 6, delete "Guidelenes)" and insert -- Guidelines) --, therefor.

In Column 10, Line 32, delete "LAPP-PROBE. Notify" and insert -- IAPP-PROBE.Notify --, therefor.

In Column 10, Line 49, delete "LAPP" and insert -- IAPP --, therefor.

In Column 11, Line 63, delete "Ti" and insert -- T1 --, therefor.

In Column 12, Line 31, delete "LAPP-ADD.notify" and insert -- IAPP-ADD.notify --, therefor.

In Column 14, Line 8, delete "M-L2S 1" and insert -- M-L2S1 --, therefor.

In Column 16, Line 9, delete "frame 10" and insert -- frame --, therefor.

Signed and Sealed this
Twenty-fifth Day of September, 2012

David J. Kappos
*Director of the United States Patent and Trademark Office*